US008841063B2

(12) United States Patent
Gardner et al.

(10) Patent No.: US 8,841,063 B2
(45) Date of Patent: Sep. 23, 2014

(54) ILLUMINATION SOURCES AND SUBJECTS HAVING DISTINCTLY MATCHED AND MISMATCHED NARROW SPECTRAL BANDS

(71) Applicant: LaserLock Technologies Inc., Bala Cynwyd, PA (US)

(72) Inventors: Norman A. Gardner, Bala Cynwyd, PA (US); Edward H. Bell, Glen Mills, PA (US); Terry Stovold, Raleigh, NC (US)

(73) Assignee: LaserLock Technologies, Inc., Bala Cynwyd, PA (US)

( * ) Notice: Subject to any disclaimer, the term of this patent is extended or adjusted under 35 U.S.C. 154(b) by 0 days.

(21) Appl. No.: 14/028,131

(22) Filed: Sep. 16, 2013

(65) Prior Publication Data

US 2014/0016325 A1 Jan. 16, 2014

Related U.S. Application Data

(63) Continuation of application No. 13/099,498, filed on May 3, 2011, now Pat. No. 8,551,683, which is a continuation of application No. 10/596,028, filed as application No. PCT/US2005/004579 on Feb. 11, 2005, now Pat. No. 7,939,239.

(60) Provisional application No. 60/572,823, filed on May 20, 2004.

(51) Int. Cl.

| | |
|---|---|
| ***G03C 1/00*** | (2006.01) |
| ***C04B 14/00*** | (2006.01) |
| ***F21V 9/00*** | (2006.01) |
| ***G07D 7/12*** | (2006.01) |
| ***B42D 15/00*** | (2006.01) |
| ***G03G 21/04*** | (2006.01) |
| ***G09F 3/00*** | (2006.01) |
| *H01J 61/32* | (2006.01) |

(52) U.S. Cl.

CPC . *B42D 15/00* (2013.01); *F21V 9/00* (2013.01); *G07D 7/122* (2013.01); *G03G 2215/00295* (2013.01); *G03G 2215/00299* (2013.01); *G03G 2215/00932* (2013.01); *G03G 21/046* (2013.01); *H01J 61/327* (2013.01); *G09F 3/0291* (2013.01)

USPC ........................................ 430/270.1; 106/400

(58) Field of Classification Search

USPC ......................... 430/270.1; 106/400; 362/231

See application file for complete search history.

(56) References Cited

U.S. PATENT DOCUMENTS 3,989,775 A 11/1976 Jack et al.
4,582,294 A 4/1986 Fargo (Continued)

OTHER PUBLICATIONS

Gardner et al., U.S. Office Action mailed May 21, 2010, directed to U.S. Appl. No. 10/596,028; 6 pages.

(Continued)

*Primary Examiner* — William Choi

(74) *Attorney, Agent, or Firm* — Morrison & Foerster LLP

(57) ABSTRACT

A light source is configured to emit a narrow peak at a discrete spectral band, especially at a primary color wavelength. The light source can have a plurality of narrow peaks to simulate the effect of a broadband light source. A subject is provided with a pigment, such as certain rare earth lanthanides, with a strong absorption peak at a corresponding narrow spectral band. The pigment has a nominal color when illuminated by a true broadband light (e.g., sunlight) that does not have a narrow peak at the discrete spectral band, and has a different color when illuminated by the light source that has a narrow peak. This color shift can be used for security authentication, information and decorative applications.

19 Claims, 5 Drawing Sheets

(56) References Cited

U.S. PATENT DOCUMENTS

| | | | | |
|---|---|---|---|---|
| 5,702,511 | A * | 12/1997 | de Saint-Romain et al. | 106/31.32 |
| 5,851,279 | A | 12/1998 | Babler | |
| 6,313,754 | B1 | 11/2001 | Shimomura | |
| 6,483,576 | B1 | 11/2002 | Gardner | |
| 6,768,555 | B2 | 7/2004 | Chen et al. | |
| 2003/0173406 | A1 * | 9/2003 | Bi et al. | 235/491 |
| 2005/0122593 | A1 | 6/2005 | Johnson | |

OTHER PUBLICATIONS

Gardner et al., U.S. Office Action mailed Jan. 21, 2011, directed to U.S. Appl. No. 10/596,028; 8 pages.

Gardner et al., U.S. Office Action mailed Jan. 16, 2013, directed to U.S. Appl. No. 13/099,498; 6 pages.

Search Report and Written Opinion mailed Aug. 9, 2005, directed to International Application No. PCT/US05/04579; 5 pages.

Communication persuant to Article 94(3) EPC dated Mar. 22, 2013, directed to EP Application No. 05 713 481.9-1562; 5 pages.

Gardner et al., U.S. Appl. No. 61/766,372, filed Feb. 19, 2013; 18 pages.

Japanese Industrial Standards Committee, Divisional Council on Basic Items. (Mar. 1, 1990). "Classification of Fluorescent Lamps by Chromaticity and Colour Rendering Property," *Japanese Industrial Standard* (JIS) Z 9112-1990: 1-7.

Kamiya S. (1999). "Phosphors for lamps" Chapter 5—Section Two in *Phosphor Handbook*. Phosphor Research Society, CRC Press, pp. 367-373.

* cited by examiner

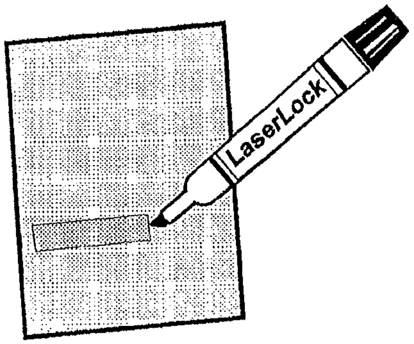
FIG. 7
FIG. 8
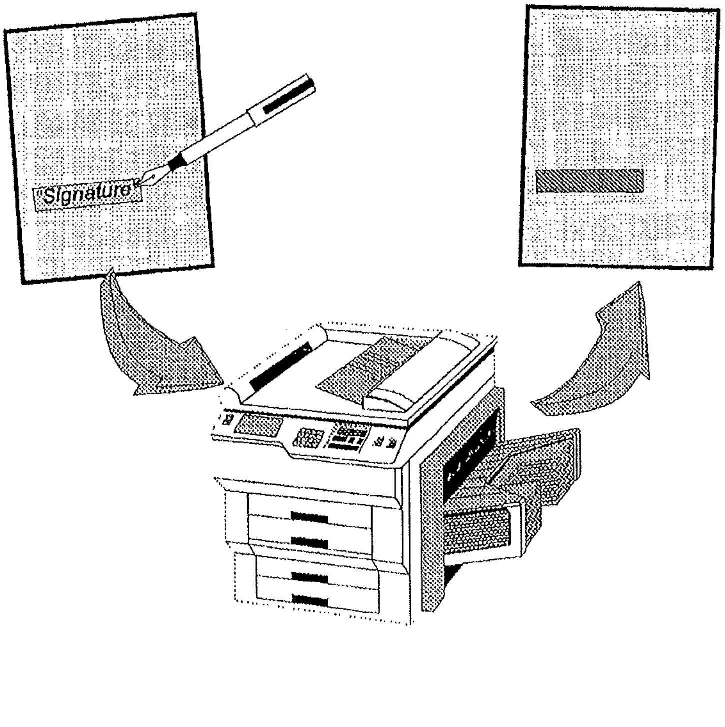

ILLUMINATION SOURCES AND SUBJECTS HAVING DISTINCTLY MATCHED AND MISMATCHED NARROW SPECTRAL BANDS

REFERENCE TO RELATED APPLICATIONS

This application is a continuation of U.S. patent application Ser. No. 13/099,498, filed May 3, 2011, which is a continuation of U.S. patent application Ser. No. 10/596,028, filed May 25, 2006, now U.S. Pat. No. 7,939,239, which is a National Stage Entry of PCT Application No. PCT/US05/04579, filed Feb. 11, 2005, which claims priority to U.S. Provisional Application No. 60/572,823, filed May 20, 2004, the entire contents of which are incorporated herein by reference.

BACKGROUND

1. Field of the Invention

The invention relates to the selective use of light sources and subjects having markedly strong (or markedly weak) light emission and absorption characteristics in certain corresponding spectral bands. By matching and mismatching illumination and absorption in certain bands, a spectrally matched (or mismatched) subject is caused to assume a distinctly different appearance based upon the illumination source used. Particular illumination sources and pigments are disclosed herein wherein a strong difference in appearance is achieved.

In one embodiment, an illumination source has narrow spectral band peaks, exemplified by certain types of fluorescent lamps. In such a source, a combination of narrow wavelength bands (typically three primary color wavelengths) when added normally simulate illumination from a broadband source such as sunlight, having a given color temperature. According to an inventive aspect, an illumination source as described is applied to a wavelength absorptive pigment that is matched to at least one narrow band in the source, by virtue of a band at which the pigment is strongly absorptive. The preferably narrow absorptive band of the pigment is at least partly complementary to one of the color peaks emitted from the lamp.

An exemplary narrow band illumination source for use according to the invention may have discrete spectral peaks at particular wavelengths at visible blue, green and red wavelength bands. When these spectral peaks are added at appropriate relative amplitudes, the illumination is perceived by the eye as substantially white broadband light. A blue peak at 440 nm±15 nm, a green peak at 544 nm±15 nm and a red peak at 611 nm±15 nm are provided. Preferably, the bands are added at energy levels that cause the sum of the three sources to appear as a nominal color, for example the white of sunlight. However the technique can also produce a shift in appearance for light that is otherwise balanced, provided that there is a contribution from plural narrow spectral bands.

A particular pigment having a nominal color when illuminated with a true broadband source is specifically matched to the narrow band illumination source as described. Preferably the pigment has an absorptive peak (i.e., a reflective spectral gap) that is sufficiently strong and sufficiently matched to the wavelength band of one of the illumination source peaks that the overall color or hue, from the summed proportions of reflected colors from the pigment, shifts substantially and noticeably based on whether the particular narrow band keying peak wavelength is present in the illumination source.

2. Prior Art

It is known that materials exhibit different hues (colors) when illuminated with a light source that is complementary to characteristic colors in the reflective spectrum of the colored material, versus a light source that is not complementary.

In daylight illumination conditions, namely under light from the sun, the full visible spectrum is substantially represented. In sunlight, a nominal range of colors is visible because the light energy is spread over the entire range of visible wavelengths. Under such conditions, the appearance of an illuminated subject Is determined substantially only by the pigmentation of the subject, which determines the reflective spectrum of the subject. Thus, in sunlight, a red pigmented object appears red, a blue pigmented object appears blue, etc. Having evolved in sunlight, humans are adapted to distinguishing among illuminated objects based on their coloration as illuminated by a white or broadband source.

The solar spectrum is not wholly broadband. There are various spectral absorption lines introduced in the solar photosphere (known as Fraeunhofer lines). Also, the emission spectrum of he sun has a general peak at a color temperature around 5800° K. The characteristic illumination spectrum or color of the sun is more yellow than some blue or hotter stars but not as red as some cooler stars. At different times of day and in different atmospheric conditions, the spectrum of sunlight may differ due to considerations such as diffraction and atmospheric dust, for example causing the sunrise and sunset to appear more red than noon sunlight. Notwithstanding these variations, a daylight illumination spectrum is substantially broadband. There is a generally equal distribution of light energy over the visible spectrum. The reflective spectrum of illuminated subjects substantially determines the color appearance of the subjects, and not any aspect of the illumination, There are some instances in which colored illumination is employed for effect. In day to day lighting applications, colored illumination might be undesirable because the colored lighting causes a subject to appear abnormal or unnatural. In other applications, colored light might be used deliberately because it is considered to make certain subjects more appealing than they might appear under flat spectrum broadband ("white light") illumination. Typically, colored or tinted illumination involves adjusting the relative power level of a source toward generally redder "warm" tones or toward generally cooler and possibly harsher or more revealing bluer tones.

A light source might be tinted sufficiently that objects that should look "white" assume the tint of the light source to some extent. The ability of a human subjectively to detect subtle tints is limited and fades over time. After a time of exposure to a tinted light source, the light source seems white. The tint level and hue of lighting can have various effects. Fresh meats may look more appealing in slightly red light. Fresh vegetables may be more appealing in green or yellow light. Persons may have a skin tone that looks healthier with a bit of extra red.

In order to be effective for the foregoing purposes, differences in the color balance of light sources need to be subtle. The desired effects (healthy appearance or the like) might be defeated if a situation occurred wherein an article was successively illuminated by one light source and then another with a different tint. Illumination might be used to alter the appearance of a subject in a more radical way. A particular tint could be used to reveal a certain color and to wash out or mask certain other colors.

The emission spectra of light sources is a much studied matter. This is particularly the case for fluorescent lamps because there is an opportunity to adjust the tint of the light source by selecting among particular phosphor compositions and proportions of different compositions used to coat the inside of the fluorescent lamp (typically an elongated tube). Different phosphors have different emission spectra, but for physical or chemical reasons, the spectra generally have characteristic wavelengths where the light emission is relatively stronger and other wavelengths that are weaker.

Illumination is classified as to color temperature, which is a measure of the extent to which the spectrum tends to blue or to red. Solar radiation has a nominal color temperature of 5800° K., which can be considered the color of daylight, although daylight varies over the course of a day from a "whiter" color distribution (perhaps bluer is more accurate) to a redder one. According to JIS Standard Z 9112 (1990), there are standard ranges of color temperature for fluorescent and other lamps. Two scales used are:

| JIS Classification | $T_{cp}$ (K) | IEC Publ. 81 equivalent |
|---|---|---|
| Daylight | 5700-7100 | Daylight |
| Day White | 4600-5400 | (no equivalent) |
| White | 3900-4500 | Cool White |
| Warm White | 3200-3700 | White |
| Incandescent Color | 2600-3150 | Warm White |

The color temperature represents a measure of the wavelength of the peak energy in a distribution of light energy versus wavelength. However the spectral light energy distribution of a light source typically is not a continuous spectrum. The energy distribution of fluorescent lamp has peaks and gaps due to the emission characteristics of the individual phosphors that line the fluorescent lamp tube.

Ordinary fluorescent lamps have calcium halophosphate phosphors lining the lamp tube. These phosphors have relatively broad and continuous spectra. Their emission extends over a range of wavelengths with a relatively constant level of power versus wavelength. The emission of such phosphors at wavelengths longer than 600 nm is limited, tending to make the illumination relatively blue or white, compared to daylight, which is somewhat more yellow or reddish by comparison. Combinations with additional phosphors have been proposed to supply additional red illumination. The emissions of several phosphors are summed in an effort to better synthesize the color of daylight. Lamps constructed using this concept are wide-band spectrum lamps, although narrower band phosphors may be included in the mix to adjust the contour of the spectrum.

An alternative type of fluorescent lamp uses narrow emission band phosphors with spectral peaks at respective primary colors, and much lower power levels at other wavelengths. According the "Phosphor Handbook," CRC Press, pp. 367-373, the perception of the human eye is such that most colors can be effectively reproduced by combining light energy from narrow blue, green and red spectral bands. Particular suggested color bands are centered at wavelengths 450, 540 and 610 nm. This is the concept used in video display devices that control the brightness of red, blue and green dots at each pixel position of a display screen.

By selecting and optimizing particular phosphor compositions and combinations used In a light source, the peak emissions wavelengths can be selected as to their center wavelengths. The proportionate light energy applied at the three peaks can be varied by choice of phosphors and their proportions. In this way, the spectral balance of light intended to simulate white light or daylight is adjusted. However the spectrum of the light is not broadband and actually is comprised of a set of wavelength peaks of relative amplitudes and wavelengths selected by the phosphors used and the recipe of concentrations of phosphors used in lining the lamp.

SUMMARY OF THE INVENTION

It is an object to provide a technique for producing a visual distinction in the appearance objects when the same such objects are illuminated by different broadband or broadband-simulative light sources.

At least one of the light sources has an emission spectrum for illuminating the subject, wherein the spectrum contains concentrated light energy in a narrow band in the visible spectrum. At least one other such source has a spectrum characterized by a broad energy output in that area of the light spectrum. The pigmentation of the object (or "subject") is selected such that the subject is strongly absorptive at that limited wavelength band. In this way, the subject has a distinctly different color appearance under the respective illumination spectra of the two sources.

Other objects that lack the strongly absorptive wavelength band typically appear substantially the same under both light sources. Moreover, the subject that has the strongly absorptive wavelength band appears substantially the same if compared under other pairs of illumination sources, unless one of such sources includes a narrow spectral peak corresponding to the absorptive band in the pigmentation of the subject.

The difference or contrast in the appearance of the subject can be strong under different illumination conditions as described. The contrast is remarkable if the band in the illumination source corresponds closely to the band in the pigmentation of the subject and both bands are relatively exclusive and narrow.

At least one of the light sources is a broadband simulative source comprised of several narrow wavelength emission peaks. The source can have sufficient peaks to simulate a white light source but the technique is not limited to broadband white and white simulative sources. Technique applies equally to white or tinted sources, provided that a source has at least has one strong peak at a distinctive color wavelength matched to an absorption band in the pigmentation of the subject.

In a preferred arrangement, that narrowband source has an exclusive color peak that is summed with peaks at different colors to simulate white light. The critical illumination peak that complements the absorption band of the subject is within the visible range. Preferably, the peak is closely matched to the corresponding peak in the absorption spectrum of the subject. Based upon whether the subject is illuminated by the corresponding wavelength source or by a source without a narrow peak (or perhaps with a peak at a different critical wavelength), the color represented by this narrow band appears to be switched on and off. According to the invention, the effect is used to provide a very substantial and visible change In the hue of the subject under these two sources of daylight simulative forms of illumination.

One of the two light sources used for comparison preferably has a broad and continuous spectrum, such as sunlight. By comparison, the source used to test for the presence of the pigment must have a strong and exclusive narrow peak emission band, preferably functioning as a primary color component of a summed wavelength set for simulating daylight or white light and which corresponds very closely to the peak in the absorption spectrum of the pigmented subject.

It is possible to embody the invention so as to produce a distinct visible difference based on whether a strong peak existing in the illumination source corresponds to a reflective peak in the illuminated subject. It is also possible to provide a pigment in the subject that has a gap corresponding to a color component used In a particular light source. Thus, for example, where it is known that illumination will at least sometimes be provided from a narrow band source, it is possible to provide a pigment that has a distinct gap in reflective spectrum at a particular narrow wavelength band corresponding to one of the illumination peaks. In true broadband light, such as sunlight, the illuminated object has a given appearance that might be characterized as different proportions of red, blue and green. If the narrow gap in the reflection spectrum of the subject is quite narrow, its presence may not be visibly apparent under true broadband illumination, due to reflection of light energy in wavelengths close to the wavelength band of the gap, namely of nearly the same hue. Under synthetic illumination with narrow primary color peaks, the synthetic illumination might generally seem much the same as sunlight, but the presence or absence of the narrow reflective gap has the effect of switching a primary color component on or off and causes a substantial change in appearance by which the object can be tested for the presence of the pigment.

Pigments can be produced with strong but narrow absorptive responses to match or mismatch particular narrow band light sources. The presence or absence of the narrow band absorptive pigment is plainly visibly apparent from the appearance of the pigmented object under one of the light sources versus the other.

In a preferred arrangement, the broadband illumination source is a fluorescent lamp possessing a discontinuous spectral power distribution with light emissions concentrated in specific wavelengths. Such lamps are typically designed to simulate natural sunlight by producing a set of primary color narrow-bandwidth illumination peaks. This type of fluorescent lamp is finding general acceptance and Is sometimes preferred in place of wide emission band fluorescent lamps due to the increased energy efficiency and color rendering afforded by the narrow emission spectrum. Narrow emission band lamps are available in several configurations, some being commonly called cold cathode lamps, compact fluorescent lamps, etc.

In a preferred arrangement, the complementary emission peak of the source and absorption peak of the subject occur at advantageous wavelengths for producing a plainly visible color difference. This can be readily accomplished by using a complementary peak wavelength corresponding to a primary color. The apparent hue of the subject can be shifted (for example and without limitation) from tan to reddish pink or from maroon to blue or from green to yellow, depending on which material is used to pigment the illuminated subject. Advantageous pigments that are likewise strongly and selectively absorptive at these narrow key wavelengths' are disclosed herein. Sunlight is characterized by a substantially flat response over a range encompassing these key wavelengths (although there are narrow photosphere absorption bands as already mentioned). Incandescent lamps also have a flat emission characteristic and lack such narrow peaks. Standard fluorescent lamps containing mercury vapor or the like to emit ultraviolet light that stimulates a phosphor coating exhibit broad peaks, not the required narrow peaks, at the noted wavelength. As a result of the foregoing attributes, most subjects that are encountered appear the same under any of these sources of illumination, because such subjects are not characterized by strong difference in light absorption in the narrow wavelength band where these sources exhibit a strong difference in their light power distribution spectrum The invention relates to the selective use of light sources and subjects having markedly strong (or markedly weak) light emission and absorption characteristics in certain spectral bands. By matching and mismatching illumination and reflection in certain bands, a spectrally matched (or mismatched) subject is caused to assume a distinctly different appearance based on the illumination source used.

The preferred technique marks subjects so as to provide different color appearances based on the illumination source used, wherein the illumination sources are substantially broadband sources, but include or omit a narrow band at which a pigment In the subject is responsive. This discreet illumination at discrete wavelengths provides a substantial change in the appearance of the subject. However, the difference between the light sources that produce one appearance or the other is a specific wavelength band and its presence or absence are not apparent at all except for the changed appearance of the matched (or mismatched) pigment.

The invention has application in security situations, for example to mark items with a measure of authenticity that is represented by the color shift seen under the required type of illumination, namely illumination from a source having an energy characteristic at one or more key wavelengths greater than its average level in the visible spectrum. The existence of the color shifting mark or code can be revealed under conditions that are known to the party that seeks to check authenticity.

Cold cathode fluorescent lamps and compact fluorescent lamps are nonlimiting examples of a narrow band illumination sources that are applicable in that they typically have distinct spectral peaks that normally are provided to sum for the effect of a broadband illumination source. According to the invention, these and other similar sources can be paired with pigments having absorption characteristics that are matched, preferably narrowly, to one or more of the spectral peaks of the source.

The invention can be used as a normally hidden code carrier for applying tracking symbols or other indicia to a subject wherein the key color corresponds to part of the reflective spectrum of a pigment by which a symbol or color patch or other indicator is printed or coated onto the subject or otherwise incorporated into an exposed area of the subject. The invention can be used to mask a normally visible code in a background of a similar hue wherein the invention is used to cause the background or foreground to change hue so as to develop a contrast revealing the particular code. In these and other similar situations, the existence or content of the code is concealed until the particular illumination source is applied.

The invention is apt for security marking of common articles to be authenticated, such as tickets and passes, identification documents such as drivers' permits or passports, paper currency, packaging of authentic articles subject to counterfeiting, or even persons, such as persons attending events such as concerts, The marking may comprise a coded symbol, or simply may be a spot or area or background applied with a particular pigment. The marking may be applied to all or part of such articles, and the part may have a function associated with a security function, such as marking a signature area or discreetly providing a removable coating on a signature area so as to show tampering, or to provide a color shift revealed specifically when photocopier or scanner lamps are used to record an image using a device having a narrow band light source.

One object of employing a security marking is often to make it sufficiently inconvenient or expensive to duplicate the marking, compared to the cost of the transaction being protected, that there is no incentive for an unscrupulous person to attempt to circumvent security. Thus in situations involved more or less expensive risks, greater or lesser security is appropriate. In US currency, for example, there are plural security markings such as colored-thread paper, microprinting, watermarks, color shifting holographic images and the like. It might or might not be justified in all situations to carefully check every security aspect or to provide the means for checking if expensive lights or magnifiers might be needed. The present invention allows various broadband simulative narrow band light sources to be used as wavelength sensitive test illumination sources, provided that the illumination bands correspond to one or more reflection bands or band gaps known to be used in a pigment to be identified if it is present.

As discussed, according to an inventive aspect, the light source used for detecting the presence of a specific type of pigment has a narrow peak in an otherwise broadband illumination spectrum. The pigment has a strong absorptive peak that overlaps the illumination peak. An apt illumination source was identified with narrow emission peaks at about 440 nm (blue), 545 nm (green) and 611 nm (red), namely a cold cathode fluorescent lamp. An apt pigment is a rare earth oxide that has been further optimized by additional processing as a sulphide or fluoride. An illustrative example is holmium oxysulphide (Ho2O2S), optimized to have a strong narrow absorption peak at 545 nm. The pigment has a tan or sand color in sunlight and dramatically shifts to a violet red appearance under the narrow band illumination source. This color shift occurs because the pigment absorbs most of the 545 nm green and the reflected color is only composed of the remaining red and blue narrow bands.

In connection with this description, the emission and absorption peaks of a matched source and pigment are paired and employed such that hue of the subject is shifted under the paired source as compared to other sources. This requires simply that the emission peak and the absorption peak overlap.

Advantageously, the overlap is by close matching of the wavelengths of the emission and absorption peaks used to effect a color shift.

Another advantageous characteristic is the narrowness of the peak. To an extent, this disclosure uses the term "narrow band" to refer to spectra that are substantially discontinuous as opposed to narrow. However, a very narrow illumination peak (and matched absorptive band) is indeed desirable as discussed herein. An exemplary illumination peak has a full-width at half maximum (FWHM) bandwidth of about 10 to 30 nm, preferably about 10 to 15 nm, and most preferably 10 nm. The desired absorptive band peak is desirably substantially equal in width.

In certain embodiments, an illumination source and an illuminated subject (or at least a surface material on the subject) are arranged according to the invention to have emission and absorption spectra, respectively, that are sufficiently "broadband" to include illuminating light that is beyond the key wavelengths used for marking, and to reflect light in wavelengths other than the key wavelengths. As a result, the subject has a normal appearance with respect to its hue, and this appearance does not change under most forms of broadband illumination. Thus the article can be carried outdoors Into the daylight, or indoors into conventional fluorescent or incandescent illumination and the subject appears the same in each case. However, if the subject is illuminated with light from a narrow emission band lamp, then key changes are visible in appearance of the subject.

The invention is applicable to security markings, for example providing a testable measure of authenticity represented by a change in appearance under selected illumination spectra. The invention is also applicable to decorative, informational and other selective changes in appearance.

The correspondence or the lack of correspondence between sharply contrasting spectral bands of light sources and illuminated subjects, is particularly useful in security authentication among other applications such as decoration. Subjects that have a given appearance in broadband daylight or in certain common spectral conditions such as fluorescent lighting or the like, can be caused to assume a distinctly different appearance (generally a different color) when the complementary strong or weak emission and reflection spectra become matched or mismatched.

According to an inventive aspect, particular spectral sources and particular formulations for pigments and dyes are disclosed, in which the contrast between appearances when the markedly strong or weak spectral bands match or do not match, is such that the difference is clearly apparent even to distinguish between certain types of conventional artificial broadband illumination sources, such as cold cathode fluorescent lamps, and natural broadband light, namely sunlight.

It is an object of the present invention to provide practical applications of security and changeable indicia that provide the greatest capacity for useful applications of such changeable indicia, using the minimum necessary equipment and expense for activating the indicia to change. More particularly, it is an object to provide changeable indicia for situations that benefit from providing distinct lighting to activate a marking or coating, but do not justify the need to provide UV lights or other specialized sources of light that emit either above or below the visible spectrum.

Among the security objects is to provide a coating, ink or other vehicle for a pigment that is responsive to a particular visible light source, in particular having a narrow band emission spectra that is or resembles that of either a compact fluorescent light source or a cold cathode fluorescent lamp. Other possible sources include colored LED light sources, wavelength filtered light sources and the like.

The invention suits the objects of certain security and other applications that normally would call for light sources having spectra that are very dissimilar to the spectrum of usual ambient visible light, such as UV blacklights, particular emission lasers or other light sources. However this is accomplished according to the invention by use of specific visible light sources that have a distinct emission spectra characterized by narrow peaks and gaps, together with a pigment that is selectively responsive at the wavelengths of specific peaks and/or unresponsive at the gaps in the spectrum. In particular, it has been discovered that the emission spectrum of the fluorescent lamp that is currently sold as a long-lasting low-power dissipation fluorescent light source for simulating incandescent bulbs in consumer floor and desk lamps, wall fixtures and the like, has an emission spectrum with peaks and gaps at distinct wavelengths. It has also been discovered that the emission spectrum of the cold cathode fluorescent lamp that is currently sold as a long-lasting low-power fluorescent light source for use in copy machines, scanners, sign and LCD backlights, and the like, has an emission spectrum with peaks and gaps at distinct wavelengths. The invention can be practiced, for example, by application of selected phosphors that have an absorption spectrum that complements the emission spectrum of such light sources. The phosphors in turn can have an emission spectrum that is usefully applied, such as a reflective and absorptive spectrum that provides light at a distinct color or shade when illuminated by the particular emission spectrum of the light source.

BRIEF DESCRIPTION OF THE DRAWINGS

FIG. 7 illustrates application of a pigment to a zone on a document.

FIG. 8 illustrates a signature line as the zone, wherein the invention is employed to alter contrast.

DETAILED DESCRIPTION OF PREFERRED EMBODIMENTS

Figure 1:
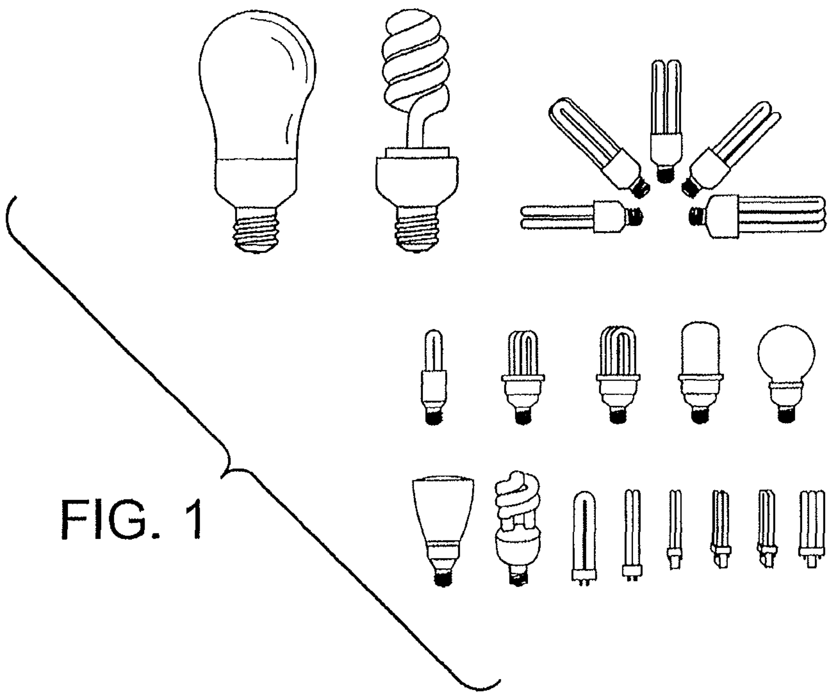
FIG. 1 is an illustration of several different Compact Fluorescent Lamps.

According to the invention, a light source is configured to emit narrow peaks at discrete spectral bands, especially primary color wavelengths, added to simulate the effect of a broadband light source. A subject is provided with a pigment, examples being certain rare earth lanthanides, with a strong absorption peak at a corresponding narrow spectral band. The pigment has a nominal hue under true broadband light. When illuminated by the narrow band source, the absorption peak eliminates the contribution of one of the primary colors, producing a distinct shift in hue of the pigmented subject. The change in hue cannot be anticipated from the appearance of illuminated subjects that lack the pigment, which remain normal. The narrow absorption peak is not noticeable under unmatched light sources or true broadband light sources, e.g., sunlight. The hue shift effect is useful for security authentication, informational and decorative applications An aspect of the invention is the matching of a pigment having a particular reflection and absorption spectrum to the emission spectrum of a narrow emission band fluorescent lamp such as either a compact fluorescent lamp or a cold cathode fluorescent lamp. An exemplary compact fluorescent “bulb” is shown in FIG. 1. This form of bulb is available from a number of manufacturers, and typically have an emission spectrum that is designed to resemble the emission of an incandescent bulb, e.g., with a tungsten filament, operated in turn at a power level intended to simulate the spectrum of the sun.

Therefore, these compact fluorescent bulbs are daylight balanced by selection of phosphors and operational parameters. They typically have an electronic ballast operable to apply a preferably high frequency alternating current, so as to be substantially flicker-free and to closely match the color of daylight. However such lamps dissipate only about 25% of the electrical power of an incandescent tungsten filament bulb operable at the same light output level.

Figure 2:
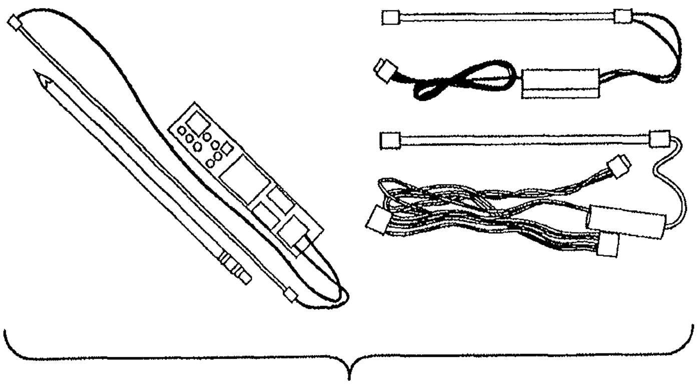
FIG. 2 is an illustration of several different Cold Cathode Fluorescent Lamps

An exemplary cold cathode fluorescent lamp is shown in FIG. 2. This form of bulb is available from a number of manufacturers and has the narrow band emission spectrum described above. These lamps have many applications, including desk illumination, copy machine light sources, signage illumination and LCD backlights. It is an aspect of the present invention to exploit the fact that compact fluorescent lamps and cold cathode fluorescent lamps have a line spectrum that is distinct from other light sources, including not only incandescent bulbs but also typical full size fluorescent lamps with broad emission bands used in many industrial and domestic applications. Such full size fluorescents typically use a starter to initiate conduction in mercury vapor, to provide UV emissions of a high energy but at short wavelengths outside the visible spectrum. The UV emissions excite phosphors that are applied in the lining of glass tubes, these phosphors producing light in the visible spectrum for illumination. Full size fluorescent lamps typically use a heated filament to vaporize mercury into vapor that sustains the UV producing arc and hence can be termed hot cathode devices. The present invention does not exclude full size bulbs, but requires that the light source have a distinct narrow line spectrum matched to pigments that are selected and used as described herein. Compact fluorescent bulbs and cold cathode fluorescent bulbs have line emission spectra that are different from that of typical linear wide band hot cathode fluorescent lamps, and thus are very apt for use according to the invention.

In addition to compact fluorescent lamps and similar lamps that simulate broadband illumination using discrete narrow band emissions using phosphors, it is possible to provide narrow band emissions by using colored LEDs, laser diodes, lasers, narrow band filtered sources and other devices that likewise can provide discrete wavelength peaks in illumination spectra.

According to the invention, rare earth compounds are employed in pigments and coatings, which are specifically and exclusively responsive to the spectral lines in the emissions of a narrow emission band fluorescent lamp such as either the compact fluorescent device or the cold cathode fluorescent device. This enables a cold cathode or compact fluorescent light source to function as the switching impetus for changeable indicia, such as security markings, decorative coatings and the like.

According to the invention, the light emitted from either a cold cathode or compact fluorescent lamp can reveal the presence of a pigment having this excitation spectrum, e.g., as a security marking in a document or as applied to an article or to a person, or as a changeable decorative aspect by which an article assumes a different appearance when illuminated by a cold cathode or compact fluorescent device versus any light source with a different spectrum.

The function of revealing the presence of a pigment by causing a change of appearance is just one way in which the invention is usefully applied. For example, a changeable indicia also can be used to conceal indicia. According to one technique, in a scanner or copier having a document illumination light source with such a spectrum matched to a pigment, a document can be marked with the pigment in a manner that conceals indicia otherwise printed on the document by eliminating contrast between the indicia and other portions of the document adjacent to the indicia. This might cause the indicia to disappear in a scanned or copied image of the document, e.g., concealing the image of a signature.

According to another technique associated with signatures, a pigment that is revealed under a particular light source might be used to expose evidence of tampering. For example, a pigment can be used as a coating on a signature line of a credit card such that erasures that may not be apparent In broadband illumination are revealed by illumination in narrow or discrete bands that reveal the pigment by a color change.

According to the invention, pigments are selected so that they are excited by the light frequencies emitted from the specific fluorescent lamp, and in particular the distinct line spectra from a narrow emission band fluorescent lamp which can be any of the newer high efficiency linear fluorescent tubes or a cold cathode fluorescent lamp or a compact fluorescent light source, but are not excited by a cool white type of fluorescent lamp nor are they excited by incandescent sources, sunlight or "black light" ultraviolet light sources.

The combination of any narrow emission band fluorescent lamp and a specially formulated color shifting ink or paint provides for unique applications in which security markings are detectable and changeable indicia can be altered in appearance, without requiring expensive or specialized illumination light sources.

A significant advantage of using any of the readily available narrow emission band fluorescent lamps as a trigger for changeable indicia is found in the fact that the light from these fluorescent lamps produces the specific line spectra that excite the color shifting pigment or coating also produces a large amount of visible light that is generally useful for illumination purposes, e.g., room lighting. This makes reading a color shifting mark on a document or other device easier than viewing such document in the dark with a black light or other source of light that is unsuitable for room lighting, because the device is Illuminated in room light and can be manipulated in a normal way, while also bearing the alterable indicia that specifically changes color when the required excitation spectrum is present due to illumination with the required fluorescent light source.

Compact fluorescent lamps are smaller versions of standard fluorescent lamps. They typically dissipate between 5 and 40 watts, and have a brightness and color rendition that is formulated to appear similar to incandescent lights. Unlike standard fluorescent lamps, compact fluorescent lamps are designed to directly replace standard incandescent bulbs. FIG. 1 shows that such compact fluorescent devices can be housed in globes to resemble incandescent lamps. The formulation to resemble the emissions of incandescent lamps is such that various compact fluorescent bulbs have line spectra that can be used.

Compact fluorescent lamps work much like standard fluorescent lamps. They each comprise a gas-filled tube and a magnetic or electronic ballast. The gas in the tube glows when electricity from the ballast flows through it and the light energy from the gas is generally in the invisible ultraviolet. These ultraviolet emissions excite a phosphor coating on the inside of the tube, which emits visible light over the whole surface of the tube. The emitted light has an emission spectrum with narrow emission line peaks as compared to the broadband emissions of a tungsten filament and as compared to light from the sun.

Compact fluorescent lamps are available in a variety of styles and/or shapes, a few being shown in the drawings as nonlimiting examples. Some have two, four, or six tubes. Some have a circular tube in a torus. The tube could be spherical. Versions that are made particularly compact so as to occupy about the same volume as an incandescent bulb advantageously have a helical tube.

Various distinctions of size, shape, ballast type and arrangement, starter circuits (or lack thereof) and other aspects may differ. However, the products in each case have a narrow emission band spectrum and thus can be matched to phosphors that are responsive at the wavelengths where the products emit and generally not (or perhaps only minimally) at other wavelengths, rendering the devices useful when the matched phosphors are used to provide security, decorative or other alterable indicia.

Figure 3:
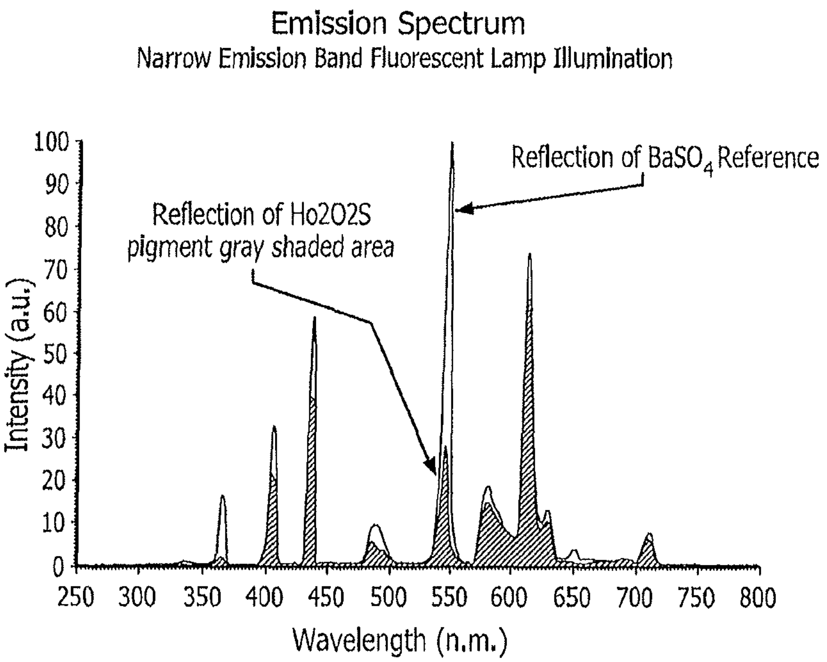
FIG. 3 is an output plot from a spectrophotometer showing one of the described color shifting pigments (a holmiumoxysulfide Ho2O2S) and a reference material (barium sulphate BaSO4) illuminated by a compact fluorescent lamp.

FIG. 3 is an output plot from a spectrophotometer showing one of the described color shifting pigments (a holmiumoxysulfide Ho2O2S) and a reference illuminated by a compact fluorescent lamp. The reference material is Barium sulphate which is used as a reflectance reference because the barium sulphate reflects nearly 100% of the visible light. FIG. 3 shows that the illuminating light source is a narrow emission band lamp and it can be seen that the blue peaks at 405 and 435 nm are somewhat reduced by the absorption of the pigment. The red peak at 610 nm is only slightly reduced, but the green peak at 545 nm is significantly reduced by the selective absorption of the pigment material. The loss of most of the green and a significant portion of the blue reflected light is what causes a noticeable and strong color shift toward the red.

Figure 4:
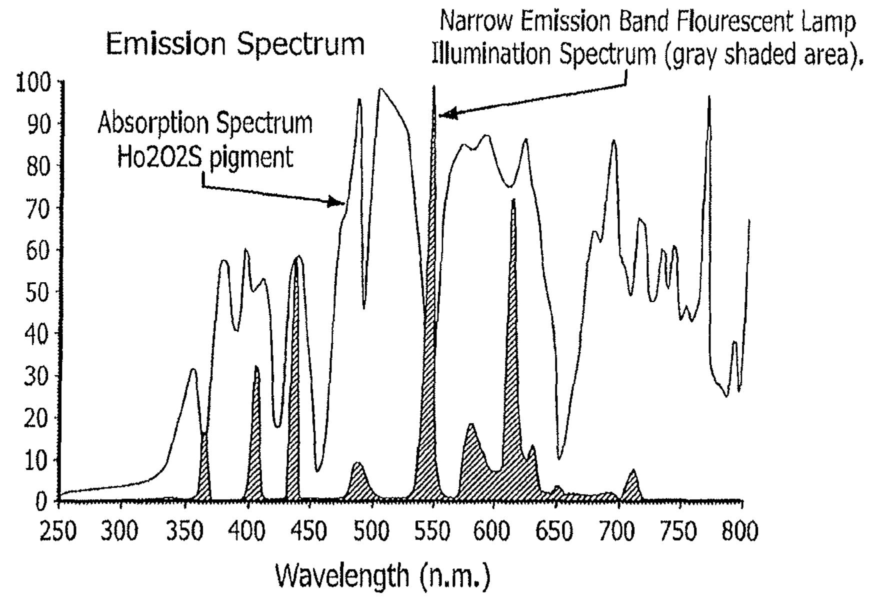
FIG. 4 is a combined emission spectrum of both the illumination source and the holmium oxysulfide absorbing sample.

FIG. 4 is an output plot from a spectrophotometer showing the complete visible light absorption spectrum of one of the described color shifting pigments (a holmiumoxysulfide Ho2O2S) and the emission spectrum from a compact fluorescent lamp. It can be seen that there is a narrow peak of emission from the lamp at 545 nm and that there is a corresponding very strong absorption peak at this same frequency, therefore the pigment is absorbing most of the 545 nm green emission from the lamp.

Figure 5:
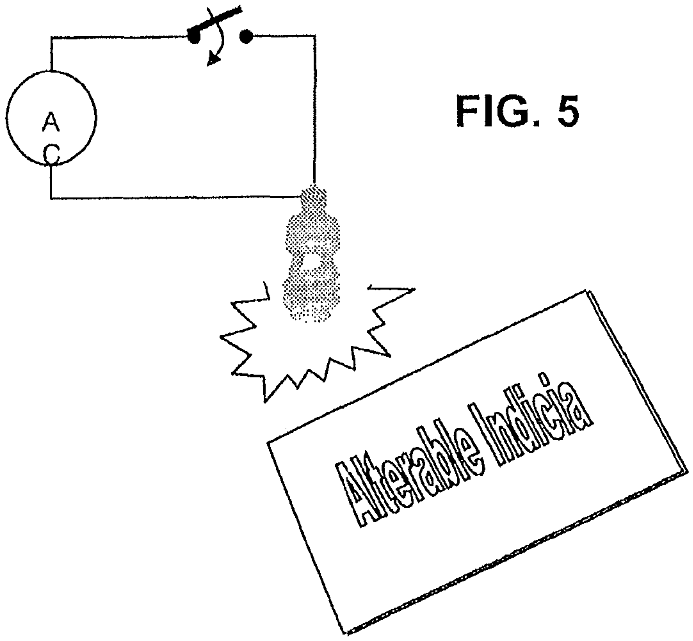
FIG. 5 is a schematic illustration showing use of a compact fluorescent bulb to activate a changeable indicia on a document or other marked item.

FIG. 5 generally shows the use of a compact fluorescent light source having a particular emission spectrum together with a pigment that is specifically responsive to the peaks in the emission spectrum of the light source. When the light source is switched on and off, an alterable indicia or coating or the like applied to an article that has been marked or coated using such pigment, changes between visible states. In the embodiment shown, there Is one light source with on and off switched states, and one alterable indicia applied using the corresponding phosphor or pigment, thus providing two visible states. The invention could also be applied to combinations of phosphors and light sources.

Among the possible applications for the combination of this specially made color shifting material and a matched cold cathode or compact fluorescent light source are various security an other applications. A non-limiting list includes, for example, anti-counterfeiting, advertisements and promotional printing, signage for advertising or notification or emergency guidance, personal markings such as badges or direct application to the skin or clothing, for access permission. The technique can provide contrast that is illuminated, for example in a document to be scanned or copied as in FIGS. 5 and 6. The technique can be used to mask contrast the it otherwise found, as in FIGS. 7 and 8. FIG. 7 shows that the pigment can be applied to a zone that is to contain an indicia, for example by applying the pigment using a highlight-type marker. If a signature is provided on that zone, color shifting of the background from the highlighter or color shifting of the ink applied to the zone with a pen can be used to introduce or to eliminate contrast, to mark the zone or to mark the indicia inked thereon.

The invention is applicable to any application in which a color shift is associated with a pigment contained in an article or applied to the article. The invention is also applicable to markings that are intended to be removed, such as rub-off coatings, coatings that are intended to reside in cracks or indentations to be revealed, etc.

Another application is to blend the matched fluorescent material with other pigments in surface coatings (paints) so that the coated surface has one color when viewed under incandescent or sunlight and a different color when illuminated by one or several of these cold cathode or compact fluorescent lamps. Another designer furnishing application could be as mood setting or color coordinating lamp shades wherein the shades alternatively or additionally comprise pigments responsive at the peak emission wavelengths of compact fluorescent light sources.

Another application that demonstrates advantages associated with using as an indicia changing trigger a light source that is also useful for simple room illumination, can be appreciated, for example, with respect to using the matched pigment to mark identification documents. The pigment could be applied for example as an anti-counterfeit mark on a drivers license. By simply replacing the existing light bulb at any license testing area or otherwise providing a cold cathode or compact fluorescent lamp, the person checking the license now has both conventional lighting to verify printed information and photograph as well as an excitation light source to activate the color shifting material. This has significant advantage in places where space or power outlets are limited, for example in bars, clubs, car rental facilities or many other places where license verification could be made more secure.

The invention can generally replace or supplement 'black light' testing and display devices, providing a similar form of test and response relationship but using as the excitation a much less intrusive and more aesthetic alternative to a black light, namely comfortable room illumination from a convenient room illumination source.

The special fluorescent pigment or coating material described herein is activated by the absorption of one or several frequencies of light that are not present in the light emitted from a conventional white light fluorescent lamp nor by a conventional 'black light' ultraviolet lamp. That is to say, the excitation spectrum of the pigment has one or more pigment activation peaks at the distinct wavelength peaks of the illumination source.

The invention is operable so long as the pigment is matched to the source sufficiently that a person viewing an item marked with the pigment can readily detect a visible difference in the alterable indicia as a function of the difference in illumination conditions when the source is on or off, An advantage of the use of a cold cathode or compact fluorescent lamp is the fact that there are visible frequencies that illuminate the device, as well as distinct illumination peak wavelengths in the visible or invisible spectral ranges. There are frequencies from the compact fluorescent light source that are not available from either the standard cool white fluorescent lamp or the conventional black light lamp.

Figure 6:
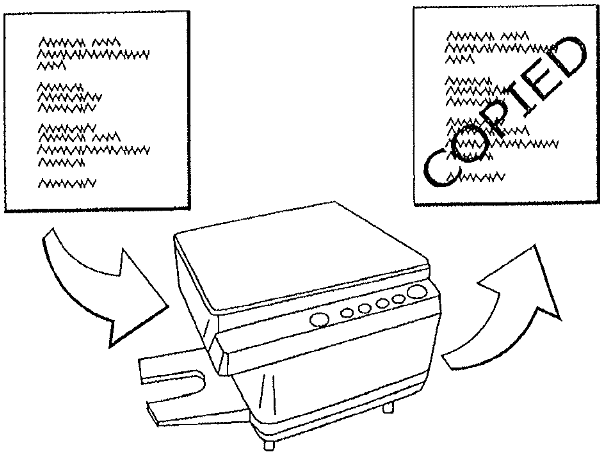
FIG. 6 is a schematic illustration showing use of a cold cathode fluorescent bulb within a copy machine to activate a changeable indicia on a document.

Another application for this material and light combination is in the manufacture of secure paper that cannot be color copied or scanned without showing an anti-copy marking on the copy, as generally shown in FIG. 6. Similarly, the pigment responsive to particular spectral lines could be arranged to overlay or to conceal adjacent indicia by defeating contrast under illumination. The light source in many copiers and document scanners is a cold cathode fluorescent lamp that exhibits the required spectral characteristics. The spectrum of the cold cathode fluorescent lamp in the copy machine activates the specially formulated color shifting material when the document is scanned and thereby leaves a mark on the copy that is not visible on the original document. This process on a color copier will leave a colored area on the copy where the fluorescent material was placed on the original.

This process on a black and white copier will leave an area on the copy where the narrow band absorbing material was placed that exhibits different contrast or darkness from the original.

Anti-copy processes are available that perform the anti-copy marking by implementing various printing techniques, but this requirement has never been successfully accomplished using a narrow band light absorbing mark on the document that is illuminated by the spectrum of the copy machine lamp. This marking method would prevent copying of any document that was marked with this material. This could be used to prevent copying of bank checks, payroll checks, contract documents, paper currency, postage stamps, bearer bonds, drug prescriptions, receipts of purchase, drivers licenses, identity badges, or any of many categories of documents that must remain 'original' and unable to be copied.

Another application for this material and for the combination of a matched line spectral light source and pigment, is in signage. Certain back-lighted signs use cold cathode fluorescent lamps to direct light through translucent panels. To produce colors other than white, the light is directed through colored filters. By applying or embedding color shifting material with an excitation spectrum that is matched along spectral lines with the source of the illumination, for example blending the pigment into the plastic sign covering material, unique coloration and effects can be produced when the back-lighting is on.

According to such an embodiment, for example, the standard "cool" fluorescent lamp in the door of a slot machine, vending machine, arcade game or the like, can be substituted with a cold cathode lamp having predetermined spectral peaks matched to colored pigments. The glass front cover or window on the machine is painted with a pigment or with a paint that has at least some of the pigment included. The pigment color shifts when the light source is on. By use of such paint, optionally silk screening selected areas of the cover with symbols or images, the depiction on the glass can be made to offer a unique color change as the illumination is switched on and off. This color change could also be made to be apparent when the illumination of the sign from the narrow emission band lamps exceeds the illumination from a broad-band source, such as sunlight. This could be used to provide different coloration of the sign or object, for example as the sun goes down.

The invention has been discussed with respect to a number of examples that should not be considered limiting, but instead are illustrations of how a line spectral light source and a matched color shifting pigment are advantageous, and in particular how such an arrangement is quite useful wherein the line spectral light source is a distinct form of known illumination source, such as a cold cathode or compact fluorescent light with a spectrum that also produces visible 'white' light as well as the special wavelengths. Additional variations within the scope and of the invention should be rendered apparent to persons skilled in the art after reviewing this disclosure.

What is claimed is:

1. An object that is marked with a pigment, the object comprising:

a pigment having a distinctively stronger absorption peak at a predetermined wavelength compared to other wavelengths, wherein the pigment has a first visible color when illuminated by a first light source having an illumination spectrum characterized by a distinctively stronger narrow band emission peak at the predetermined wavelength compared to other wavelengths, the emission peak having a full-width at half maximum of 10 to 30 nm, and the pigment has a second visible color that is different from the first visible color when illuminated by a second light source that is different from the first light source and does not have a distinctively stronger emission peak at the predetermined wavelength, wherein the absorption peak of the pigment corresponds to a red, green, or blue wavelength.

2. The object of claim 1, wherein the pigment is on a surface of the object.

3. The object of claim 1, wherein the pigment is incorporated inside the object.

4. The object of claim 1, wherein the pigment is used as a marker of the object.

5. The object of claim 1, wherein the pigment is characterized by two reflection peaks, one each on either side of a reflection gap that matches the distinctively stronger narrow band emission peak of the first light source.

6. The object of claim 1, wherein the pigment is a rare earth lanthanide.

7. The object of claim 1, wherein the pigment is holmium oxysulphide optimized to have the distinctively stronger absorption peak at 545 nm.

8. The object of claim 1, wherein the first light source has at least one additional emission peak at a wavelength that is different from the predetermined wavelength such that the first light source provides a simulated broadband illumination, and the first distinctively stronger emission peak and the at least one additional emission peak of the first light source include a green, red, or blue emission peak.

9. The object of claim 1, wherein the first light source is a LED.

10. The object of claim 1, wherein the second light source is sunlight.

11. The object of claim 1, wherein a width of the distinctively stronger absorption peak of the pigment is equal to a width of the distinctively stronger narrow band emission peak of the first light source.

12. The object of claim 1, wherein the distinctively stronger narrow band emission peak of the first light source has a full-width at half maximum of 10 to 15 nm.

13. The object of claim 1, wherein the distinctively stronger narrow band emission peak of the first light source has a full-width at half maximum of about 10 nm.

14. An illumination system matched to a pigment marking a subject, the system comprising:

an illumination source that emits light having an illumination spectrum comprising:

a first distinctively stronger emission peak at a first wavelength compared to other wavelengths, the first distinctively stronger emission peak corresponding to a first visible color, a second emission peak at a second wavelength that is different from the first wavelength, the second emission peak corresponding to a second visible color, and a third emission peak at a third wavelength that is different from the first and second wavelengths, the third emission peak corresponding to a third visible color, such that the light source provides simulated broadband illumination, wherein the illumination source is matched to the pigment such that the first distinctively stronger emission peak at the first wavelength matches a distinctively stronger absorption peak of the pigment, and the illumination source illuminating the pigment causes the pigment to have a color that is different from a nominal color, which is a color that the pigment has when illuminated by broadband light that does not have a distinctively stronger narrow band emission peak at the predetermined wavelength.

15. The illumination system of claim 14, wherein the illumination source is matched to the pigment such that the first distinctively stronger emission peak at the first wavelength has a width that is equal to a width of the distinctively stronger absorption peak of the pigment.

16. The illumination system of claim 14, wherein the illumination source is a LED.

17. An illumination system matched to a pigment marking a subject, the system comprising:

an illumination source that emits light having an illumination spectrum characterized by a distinctively stronger narrow band emission peak at the predetermined wavelength compared to other wavelengths, the emission peak having a full-width at half maximum of 10 to 30 nm, wherein the illumination source is matched to the pigment such that the distinctively stronger emission peak at the predetermined wavelength matches a distinctively stronger absorption peak of the pigment, and the illumination source causes the pigment to have a first visible color when illuminated by the illumination source, the first visible color being different from a nominal color, which is a color that the pigment has when illuminated by broadband light that does not have a distinctively stronger narrow band emission peak at the predetermined wavelength, wherein the emission peak of the illumination source corresponds to a red, green, or blue wavelength.

18. The illumination system of claim 17, wherein the illumination source is matched to the pigment such that the distinctively stronger emission peak at the predetermined wavelength has a width that is equal to a width of the distinctively stronger absorption peak of the pigment.

19. The illumination system of claim 17, wherein the illumination source is a LED.

* * * * *